Jan. 19, 1965 W. SPINGLER ETAL 3,166,255
FLY CUTTER MILL

Filed Aug. 4, 1961 2 Sheets-Sheet 2

Inventor
Werner Spingler
Ferdinand Scheu
By Bailey, Stephens & Huettig
Attorneys United States Patent Office 3,166,255
Patented Jan. 19, 1965

3,166,255
FLY CUTTER MILL
Werner Spingler, Schutzenhaus 11, Neuffen, Wurttemberg, Germany, and Ferdinand Scheu, Gartenstrasse 19, Beuren, Kreis Nurtingen, Germany
Filed Aug. 4, 1961, Ser. No. 129,400
Claims priority, application Germany, Aug. 13, 1960, E 19,769
4 Claims. (Cl. 241—101)

The present invention relates to a mill for grinding or blending which consists of a hand mixer which is driven by an electric motor in a housing which is also designed to serve as a grip, a drive shaft extending from the motor housing and carrying a removable chopping blade or fly cutter, and a grinding vessel upon which the hand mixer is placed to carry out the grinding or blending operation.

The hand mixers of prior designs may be employed as mills by fitting a fly cutter upon the end of the drive shaft which extends from the motor housing. These devices also require a special grinding vessel which has a removable cover with an aperture therein through which the drive shaft of the mixer projects into the vessel in which the grinding or blending process is carried out. The mixer then rests by means of the protecting hood above the fly cutter on the cover of the grinding vessel, while the deflecting blades which are mounted on the protecting hood are disposed in apertures in the edge around the cover opening and lock the grinding vessel and mixer against any rotation relative to each other. Before being used as a mill, a mixer of this type first requires the cover to be fitted upon the deflecting blades, then the fly cutter to be secured to the end of the drive shaft, and finally the grinding vessel to be fitted upon the cover. One serious disadvantage of these known apparatus is the fact that the fly cutter thereof can run freely when taken out of the grinding vessel. Since such a cutter has a relatively large diameter because it must project beyond the protecting means on the mixer, such as deflecting blades or the like, there is always the great danger that a person might be seriously injured or that other objects might be damaged when the mixer motor is accidentally switched on.

Another hand mixer of a known type in which the actual drive shaft or drive shafts extend at right angles to the motor shaft is provided with a separate lateral shaft stub which may be used for driving a rotary cutter or grinder. For this purpose it is first necessary to mount the mixer housing with one end on a table or the like, and to stabilize the apparatus in this position, for which purpose the housing is provided with a handle. Thereafter the housing of the mill is fitted upon the housing of the mixer in a similar manner as with the hand mixers and stationary mixers of the type as above described, and the mixer shaft is thereby connected to the shaft of the mill carrying the cutting blade. This is a rather complicated arrangement since the mixer has to be provided with a separate shaft end for driving the mill and since the housing has to be especially designed and manipulated so as to be sufficiently stable when it is set up for use upon a table. Furthermore, for every operation of filling and emptying the grinding vessel it is necessary to remove its cover at which time the fly cutter is again exposed so that the person using the machine when forgetting to switch off the motor is easily liable to be seriously injured. There is also the additional danger that the person using the machine might fail to remove the usual mixing tools from the shaft stubs of the mixer which extend horizontally when the mixer is set up for grinding, and that these tools which will then also rotate at a high speed while the grinding operation is being carried out might cause injury or damage.

In connection with a hand mixer of the above-mentioned kind it is also known to provide a special shaft stub which extends coaxially to the motor with a chopping blade which is usually covered by a protecting hood which is mounted on the housing. In place of the hood, a grinding vessel may be attached to the housing, and the housing must then again be set upon a table or the like so that the fly cutter and the grinding vessel will then be above the housing. For using this mixer for grinding, the following procedure must be followed: First, the protective cover must be removed, then the grinding vessel is filled, then the mixer is placed upon the grinding vessel, then both together must be turned over 180° and the housing of the mixer be placed upon the table. After the grinding operation, the same steps have to be carried out in the reverse order. The manipulation of this apparatus is therefore very complicated, aside from the fact that—just as with the apparatus previously mentioned—the failure to remove the usual mixing tools from the horizontal shaft stub might cause serious injury or damage.

Stationary mixers of the conventional type are frequently equipped with fly cutter mills which are placed upon the top of the motor housing in place of the usual mixing vessel of glass, whereby the drive shaft of the motor and the fly cutter which is rotatably mounted in a fixed position in the mill are automatically coupled to each other. These known apparatus have the disadvantage that for emptying the mill, the same must always be removed from the motor housing and must then be turned over 180° so that the coffee or other ground material will fall from the grinding vessel into the cover whereupon the latter must be removed and separated from the grinding vessel.

It is an object of the present invention to provide a mill, grinder, blender or the like of the general type as first mentioned herein which is designed so as to overcome all of the aforementioned disadvantages. This object is attained according to the invention by extending the shaft of the fly cutter, which is rotatably secured within the bottom of the grinding vessel, upwardly through this vessel toward a central aperture in the upper part of the vessel where the upper end of this shaft is connected by a coupling member to the lower end of the drive shaft of the mixer.

The chopping blade of the new mill is therefore at all times surrounded by the grinding vessel, and for operating the apparatus or for thereafter separating it from the mixer it is no longer necessary to connect the grinding vessel and the fly cutter to each other or to separate them from each other. Injuries or damages caused by the fly cutter can therefore not occur. The aperture in the top of the grinding vessel may be used for filling and emptying the vessel after the cutter and mixer shafts are disconnected, and it is therefore no longer necessary for this purpose to remove a separate cover of the mill. A removable cover which contains the aperture for the drive shaft of the mixer and is provided with means for securing the mixer to the grinding vessel may, however, be provided to permit the vessel and the fly cutter to be cleaned which is usually necessary only when a different kind of material is to be ground. This cover of the container is preferably transparent to permit the material to be seen and checked while the grinding operation is being carried out. The grinding vessel according to the invention may also consist of a base portion and a cup-shaped container which is fitted into the base portion. This division of the grinding vessel is of importance when the vessel is molded of plastic, and especially if the cover and the grinding vessel are to be removably connected by a bayonet lock and are to be provided with projections for such a lock. It also has the advantage that the two parts may be made of different colors, in which event the cup-shaped part is preferably made of a white color for hygienic and aesthetic reasons. The bearing for the shaft carrying the fly cutter may be a ball bearing or a carbide bearing.

The shaft of the fly cutter preferably consists of a flexible material in order to compensate for a disalignment between this shaft and the mixer shaft which might be due to the fact that the mixer is not so accurately centered relative to the grinding vessel as would otherwise be necessary in view of the high speed of rotation of the shafts.

The shaft of the fly cutter carries on its upper end a coupling member which is preferably designed so as to permit the mixer shaft to engage in any position with the short cutter shaft, for example, by providing the coupling member with a helical upper surface forming a tooth so that, when the mixer is switched on, a pin extending transversely through the drive shaft of the mixer automatically slides along the helical surface until it engages with the shoulder of the tooth and thus takes along the cutter shaft.

As already indicated, the grinding vessel preferably consists of a base, a cup-shaped container within the base, and a cover with an upper filling opening on this container. The deflecting blades which project from the protecting hood and which, when the mixer is being applied upon the cover of the grinding vessel, are passed into the vessel through slots in the edge of the filling opening may be provided with recesses which permit the protecting hood and the cover to be turned relative to each other and thereby to be locked to each other. The locking position may be fixed by providing the cover at a point opposite to one or more deflecting blades with suitable stops. Finally, it is of advantage to provide the outside of the wall of the grinding vessel with a sliding protection, for example, in the form of flutes.

The aforementioned objects, features, and advantages of the present invention will become more clearly apparent from the following detailed description of one preferred embodiment of the invention, as illustrated in the accompanying drawings, in which—

FIGURE 3 shows a perspective view of the entire mill; while

Figure 1:
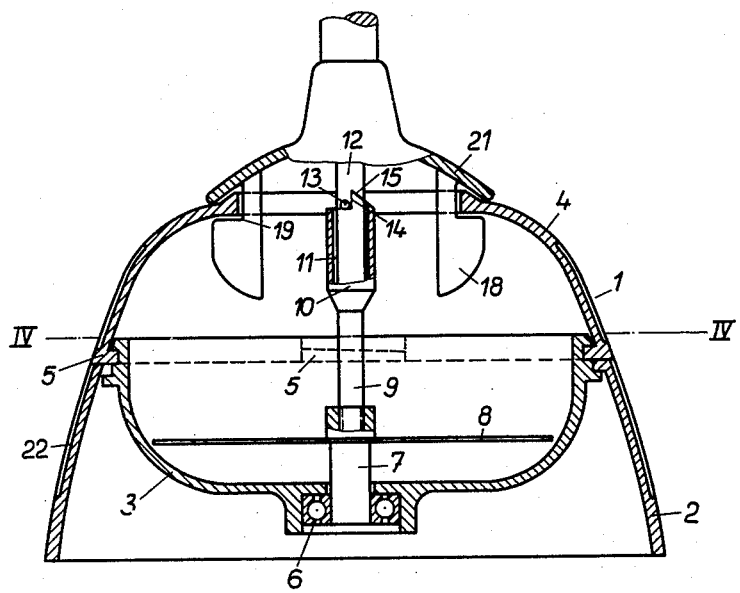
FIGURE 1 shows a cross section taken in the axial direction of the grinding vessel of the mill according to the invention with the end of the mixer shaft inserted therein.
Figure 2:
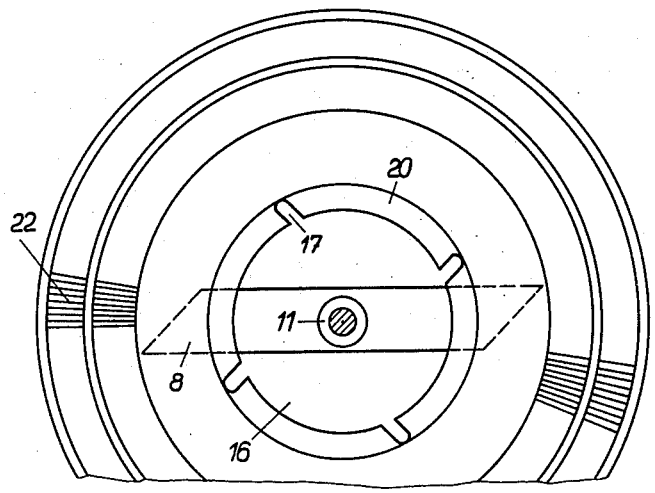
FIGURE 2 shows a plan view of the grinding vessel according to FIGURE 1.
Figure 3:
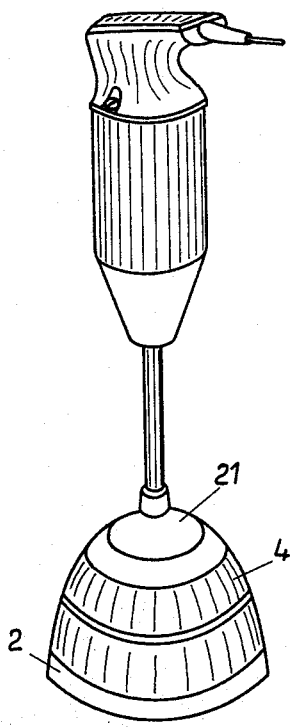
Figure 4:
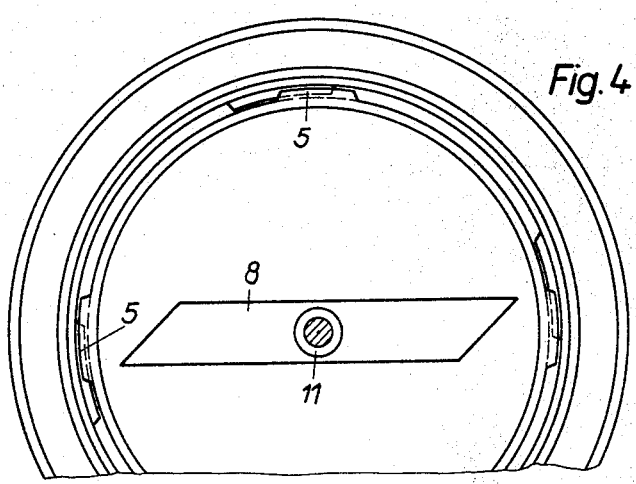
FIGURE 4 shows a cross section of the grinding vessel taken along line IV—IV of FIGURE 1.

As illustrated in the drawings, the grinding vessel 1 of the fly cutter mill according to the invention consists of a base 2, a cup-shaped container 3 which is connected to the base, and a removable cover 4 which is adapted to be locked to base 2 by means of a bayonet lock 5. The cup-shaped container 3 is provided in its bottom with a ball bearing 6 in which a short shaft 7 carrying a chopping blade or fly cutter 8 is rotatably mounted but so as to be immovable in the axial direction. At its free upper end, the cutter shaft 7 is connected to or integral with a slightly longer shaft 9 of a flexible material, for example, plastic, which is connected to a coupling socket 10 with a bore 11 therein into which the drive shaft 12 of the mixer motor is adapted to be inserted. This drive shaft 12 has a transverse pin 13 which is adapted to engage with a shoulder 14 of a tooth formed in the end of the coupling socket 10. The upper end surface 15 of this tooth is helically shaped so that, when the mixer and the fly cutter mill are connected to each other, the transverse pin on drive shaft 12 will slide along the helical surface 15 and automatically engage with the shoulder 14.

Cover 4 of grinding vessel 1 is provided with a central aperture 16 through which the drive shaft 12 of the mixer extends to the inside of the grinding vessel. The edge of aperture 16 is provided with slots 17 through which the deflecting blades 18 may be passed which are secured to the protecting hood 21 which is mounted on the end of the stationary protecting tube of the mixer surrounding drive shaft 12. Deflecting blades 19 are provided with recesses 19 which are associated with slots 17 in cover 4 and with the edge portions 20 of cover 4 intermediate the adjacent slots 17 so as to form a bayonet lock for locking the protecting hood 21 securely to cover 4 of grinding vessel 1. The edge portions 20 of cover 4 are either wedge-shaped or provided with a stop so that a secure locking effect between hood 21 and cover 4 will be attained.

The outer surface of the grinding vessel 1 is provided with a sliding protection in the form of flutes 22 to permit the two parts of the vessel, that is, base 2 and cover 4 to be firmly gripped for locking them to each other or unlocking them from each other.

Although our invention has been illustrated and described with reference to the preferred embodiment thereof, we wish to have it understood that it is in no way limited to the details of such embodiment but is capable of numerous modifications within the scope of the appended claims.

Having thus fully disclosed our invention, what we claim is:

1. In combination, a bowl having a downwardly open portion adapted to rest on a flat surface and a part within said downwardly open portion adapted to be held above such flat surface, and having a removable cover portion with a central opening therein, bearing means carried by said part on the lower side thereof, a vertical cutter shaft journalled in said bearing means and extending upwardly into said part, a chopping blade within the bowl carried by the shaft and secured thereto, a mixer adapted to be held in the hand including an electric motor and a motor shaft driven thereby, said mixer having a part adapted to engage in said central opening with the motor shaft directed downwardly through the opening towards the interior of the bowl in alignment with the vertical shaft, and a releasable coupling between the two shafts.

2. In a device as claimed in claim 1, said chopping blade being secured on said vertical shaft below the top thereof, at least that part of the vertical shaft above the chopping blade being flexible.

3. In a device as claimed in claim 1, said mixer part and cover having cooperating bayonet-joint locking means thereon to hold the mixer on the bowl.

4. In a device as claimed in claim 3, said releasable coupling comprising a pin on one of said shafts and a sloping surface and shoulder on the other shaft engageable with said pin.

References Cited by the Examiner

UNITED STATES PATENTS

| 1,465,505 | 8/23 | Zoergiebel | 241—101 |
| 2,333,246 | 11/43 | Harris | 241—101 |

FOREIGN PATENTS

| 1,234,836 | 5/60 | France. |
| 574,586 | 3/58 | Italy. |

OTHER REFERENCES

German application, 1,078,300, 3/60, 241—101.
German application, 1,086,023, 7/60, 241—101.

J. SPENCER OVERHOLSER, *Primary Examiner.*

R. O. O'LEARY, *Examiner.*